April 6, 1965  J. W. HOGAN ETAL  3,177,040

WHEEL RIM SECURING MEANS

Filed Dec. 10, 1962

INVENTORS
John W Hogan
BY John W Hogan Jr

Ralph Hammar
attorney

United States Patent Office 3,177,040
Patented Apr. 6, 1965

3,177,040
WHEEL RIM SECURING MEANS
John W. Hogan and John W. Hogan, Jr., both of
349 W. 7th St., Erie, Pa.
Filed Dec. 10, 1962, Ser. No. 243,464
1 Claim. (Cl. 301—6)

This invention is a wheel in which the rim is mounted by tightening a single nut.

Figure 1:
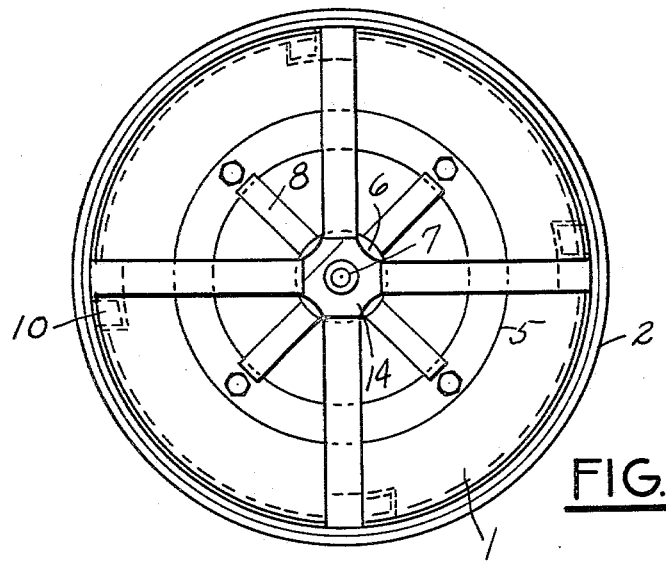
Figure 3:
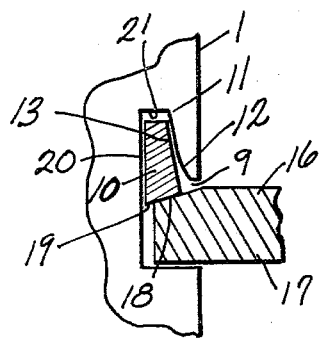
Figure 2:
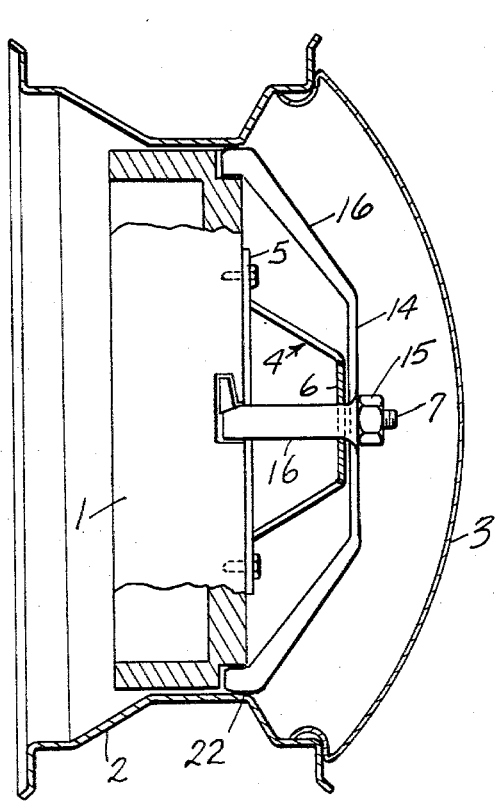

In the drawing, FIG. 1 is an end view of the wheel, FIG. 2 is a section in a plane passing through the axis of the wheel, and FIG. 3 is a detail showing the wedging action for locking the rim.

In the drawing, 1 indicates the brake drum mounted in the usual manner, 2 indicates the rim and 3 indicates the hub cap. These parts are or may be of common construction.

At the center of the brake drum is a bridge member 4 having a flange 5 solidly bolted to the brake drum and having a central section 6 carrying a stud 7. The parts 5 and 6 are connected by circumferentially spaced arms 8 which permit access to the wheel bearings for lubrication.

Around the periphery of the brake drum are a plurality of bayonet slots having axially facing entrance openings 9 for inwardly extending lugs 10 fixed to the rim. The width of the lugs 10 is sligtly less than the width of the entrance openings 9. In mounting, the rim is moved into position with the lugs 10 opposite the openings 9 and is then pushed axially, moving the lugs through the openings 9. A slight angular rotation of the rim positions the lugs within the recesses 11 to one side of the openings. A chamfer 12 facilitates the entrance of the lugs into the recesses 11, as does a taper 13 on the lugs.

The mounting of the rim is completed by a locking member having a center section 14 which fits over the stud 7 and is tightened by a nut 15. Extending from the center section are a plurality of arms 16, each of which terminates in a wedge 17 having an inclined surface 18 cooperating with an inclined surface 19 on the lug 10. As the nut 15 is tightened, the wedges 17 are moved axially into the openings 9 and the inclined surface 18 cooperates with the surface 19 to wedge the lugs 10 axially towards one side 20 of the recess 11 and circumferentially toward the bottom 21 of the recess. At the end of the tightening operation, the lugs 10 are clamped solidly against the surface 20 and are slightly spaced from the surface 21. This clamps the lugs 10 solidly against the brake drum so that no relative movement between the rim and brake drum is possible under driving and braking forces. The wedge sections 17 have outer ends 22 which fit or cooperate with the inner surface of the rim to center the rim. This centering action takes place before the locking member is tightened. Once the locking member is tightened, the lugs 10 are solidly wedged in place.

What is claimed as new is:

In a wheel, a brake drum having a plurality of bayonet slots angularly spaced around its periphery each with a narrow axially facing entrance opening connected to a recess to one side of the opening, both the entrance opening and recess being open to the periphery of the drum, a rim having a plurality of inwardly extending lugs of angular spacing corresponding to the entrance openings and each of width less than the width of said entrance opening and adapted to be received in said recess upon rotation of the rim relative to the brake drum, a bridge member fixed to said drum and carrying a stud at its center, a locking member having its center slidably fitting over said stud and arms with outer ends of angular spacing corresponding to the entrance openings entering said entrance openings and engaging said lugs, a nut on said stud for tightening said locking member toward the brake drum, the engaging surfaces of said ends and said lugs being inclined at a wedging angle whereby as the locking member is tightened toward the drum the lugs are clamped against one side of said recess.

References Cited by the Examiner

UNITED STATES PATENTS

| 1,246,678 | 11/17 | Stroud | 301—17 |
| 1,465,715 | 8/23 | Kaplan | 301—17 X |
| 2,581,554 | 1/52 | Radford | 301—63 |
| 2,949,332 | 8/60 | Madsen | 301—11 |

ARTHUR L. LA POINT, *Primary Examiner.*
ROBERT C. RIORDAN, *Examiner.*